United States Patent [19]
Bourgoin

[11] Patent Number: 5,864,839
[45] Date of Patent: Jan. 26, 1999

[54] PARALLEL SYSTEM AND METHOD FOR GENERATING CLASSIFICATION/REGRESSION TREE

[75] Inventor: Mario Bourgoin, Cambridge, Mass.

[73] Assignee: TM Patents, L.P., New York, N.Y.

[21] Appl. No.: 938,068

[22] Filed: Sep. 26, 1997

Related U.S. Application Data

[63] Continuation of Ser. No. 734,209, Oct. 21, 1996, abandoned, which is a continuation of Ser. No. 415,235, Mar. 29, 1995, abandoned.

[51] Int. Cl.⁶ .................................................. G06F 17/30
[52] U.S. Cl. .............................. 707/1; 707/101; 707/202
[58] Field of Search ............................. 382/37, 157, 159, 382/224, 226; 395/601; 707/1, 2, 200, 101

[56] References Cited

U.S. PATENT DOCUMENTS

| | | | |
|---|---|---|---|
| 4,130,865 | 12/1978 | Heart et al. .................... | 395/200.01 |
| 4,987,539 | 1/1991 | Moore et al. ...................... | 364/413.08 |
| 5,067,071 | 11/1991 | Schanin et al. .......................... | 394/275 |
| 5,263,124 | 11/1993 | Weaver et al. ............................ | 382/37 |
| 5,329,596 | 7/1994 | Sakou et al. .............................. | 382/37 |
| 5,444,796 | 8/1995 | Ornstein .................................. | 382/157 |

*Primary Examiner*—Maria N. Von Buhr
*Attorney, Agent, or Firm*—Cesari and McKenna, LLP

[57] ABSTRACT

A classification tree generating system generates a classification tree in response to a training database including a plurality of properly-classified records. A parallel base tree generating means including a plurality of processing nodes generates nodes of a base classification tree in parallel in a series of iterations, in each iteration generating nodes comprising a particular tree level in parallel. After the processing nodes generate the base classification tree in parallel, a serial tree processing means including a single processor generates a plurality of pruned classification trees in response to the base classification tree and at least one selected evaluation metric for each of the pruned trees in response to an evaluation training database including a second plurality of properly-classified records.

9 Claims, 17 Drawing Sheets

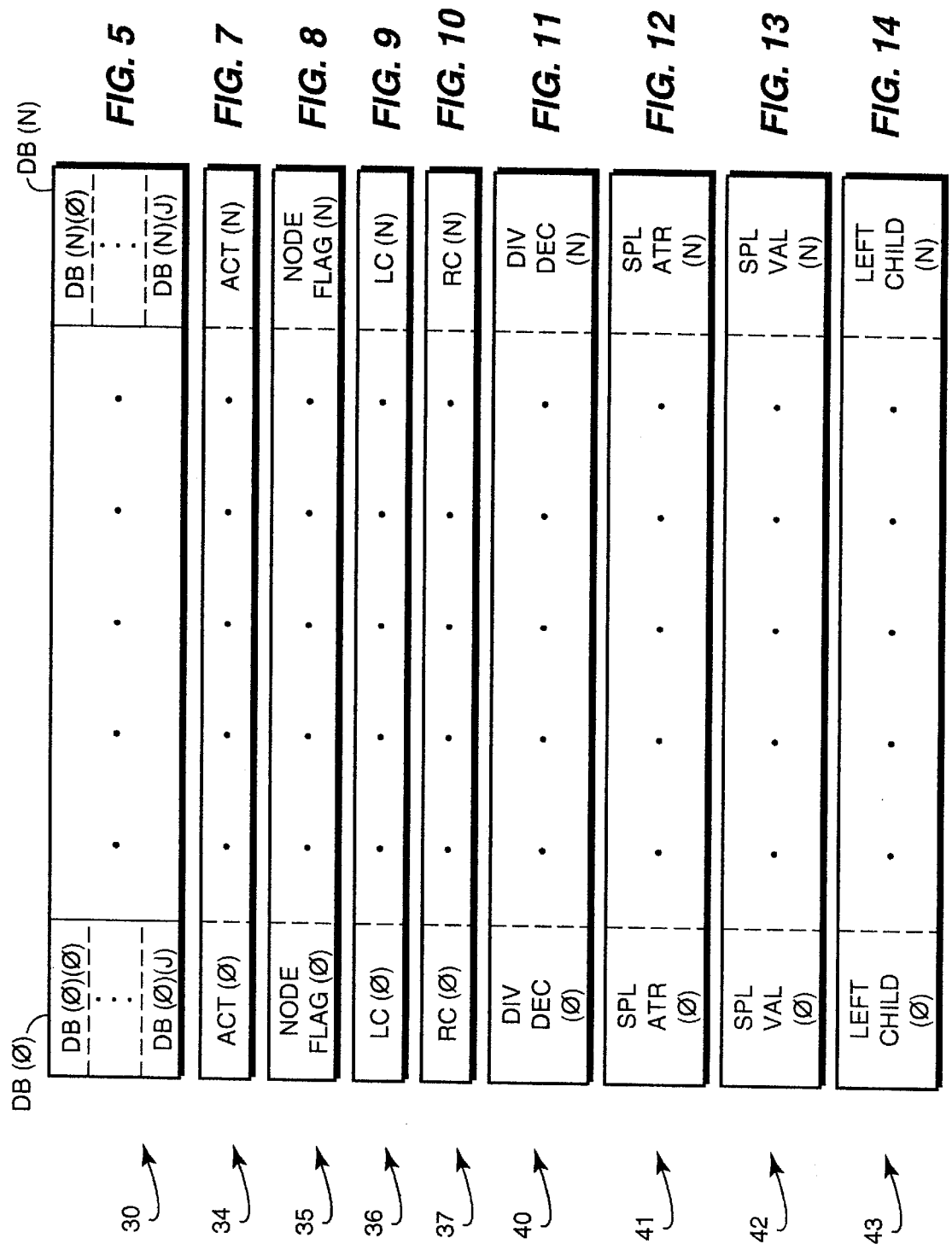

PARALLEL SYSTEM AND METHOD FOR GENERATING CLASSIFICATION/REGRESSION TREE

This is a continuation of application Ser. No. 08/734,209, filed on Oct. 21, 1996, now abandoned, which is itself a continuation of application Ser. No. 08/415,235 filed on Mar. 29, 1995 now abandoned.

FIELD OF THE INVENTION

The invention relates generally to the field of programmed digital computer systems and more particularly to systems employing parallel digital computers for classifying records in a dataset.

BACKGROUND OF THE INVENTION

Digital computers have been employed for a number of years in the maintenance and processing of large databases and datasets. In recent years, computers have been used to facilitate accurate assignment of records in a database to a set of predetermined classes, generally based on a training database of properly classified records. For example, U.S. Pat. No. 5,251,131, issued Oct. 5, 1993, in the names of Brij M. Masand and Stephen J. Smith, and entitled Classification of Data Records By Comparison Of Records To A Training Database Using Probability Weights, assigned to the assignee of the present application (incorporated herein by reference), describes a system for classifying natural language data in the form of records, after "training" using a training database comprising properly-classified records. In the arrangement described in that patent, probability weights are used to express the likelihood that a record containing particular terms in particular fields are properly assigned to particular ones of a selected set of classes.

A number of other methodologies have also been developed for classification. One methodology, generally referred to as CART ("classification and regression trees") makes use of trees to perform classification as well as regression. In the CART methodology, a tree is developed including a plurality of nodes extending from a root to a plurality of leaves. Each node, above the leaf level, represents a query, and each leaf node is associated with one of a plurality of classes. The tree facilitates the classification of individual records in, for example, a database, to selected classes based on data contained in the respective records. For each record, the query represented by the root node is applied, and the response to that inquiry provides a basis for selecting one of the child nodes so that the query represented by that node can be applied. This process is repeated through a series of queries until a response to a particular query directs the record to a leaf node, which identifies the class to which the record is to be assigned.

In developing a classification or regression tree, training database is used including a number of properly-classified records. In processing the database to identify the appropriate query to be used for each node, a substantial amount of processing is generally required.

SUMMARY OF THE INVENTION

The invention provides a new and improved system and method for generating classification and/or regression trees in parallel, thereby reducing the amount of time required to generate a classification or regression tree.

In brief summary, the invention provides a classification tree generating system for generating a classification tree in response to a training database including a plurality of properly-classified records. A parallel base tree generating means including a plurality of processing nodes generates nodes of a base classification tree in parallel in a series of iterations, in each iteration generating nodes comprising a particular tree level in parallel. After the processing nodes generate the base classification tree in parallel, a serial tree processing means including a single processor generates a plurality of pruned classification trees in response to the base classification tree and at least one selected evaluation metric for each of the pruned trees in response to an evaluation training database including a second plurality of properly-classified records.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 5 through 14 depict data structures useful in understanding the operations depicted in FIG. 4;

DETAILED DESCRIPTION OF AN ILLUSTRATIVE EMBODIMENT

Before describing the new parallel classification/regression tree generating system in accordance with the invention, it would be helpful to describe the classification/regression tree methodology and an illustrative classification/regression tree. The general classification/regression tree methodology is described in detail in L. Breiman, *Classification and Regression Trees*, (Wadsworth & Brooks/Cole Advanced Books & Software, Pacific Grove, Calif.: 1984). The methodology provides an arrangement for classifying individual records in, for example, a database, to a selected class based on data contained in the respective records. For each record, the methodology makes use of a set of inquiries applied to data contained in each record. First an initial inquiry is applied, and the response to that inquiry provides a basis for selecting a subsequent inquiry. This process is repeated through a series of inquiries until a response to a particular inquiry identifies a class to which the record is to be assigned. Generally, the series of inquiries applied to a particular record is a subset of the entire set of inquiries that may be applied. If each inquiry is analogized to a node, the set of nodes and their order of application resembles a tree. Such a tree can be used to perform classification and/or regression analysis, and will be generally identified herein as a "classification/regression tree."

Figure 1:
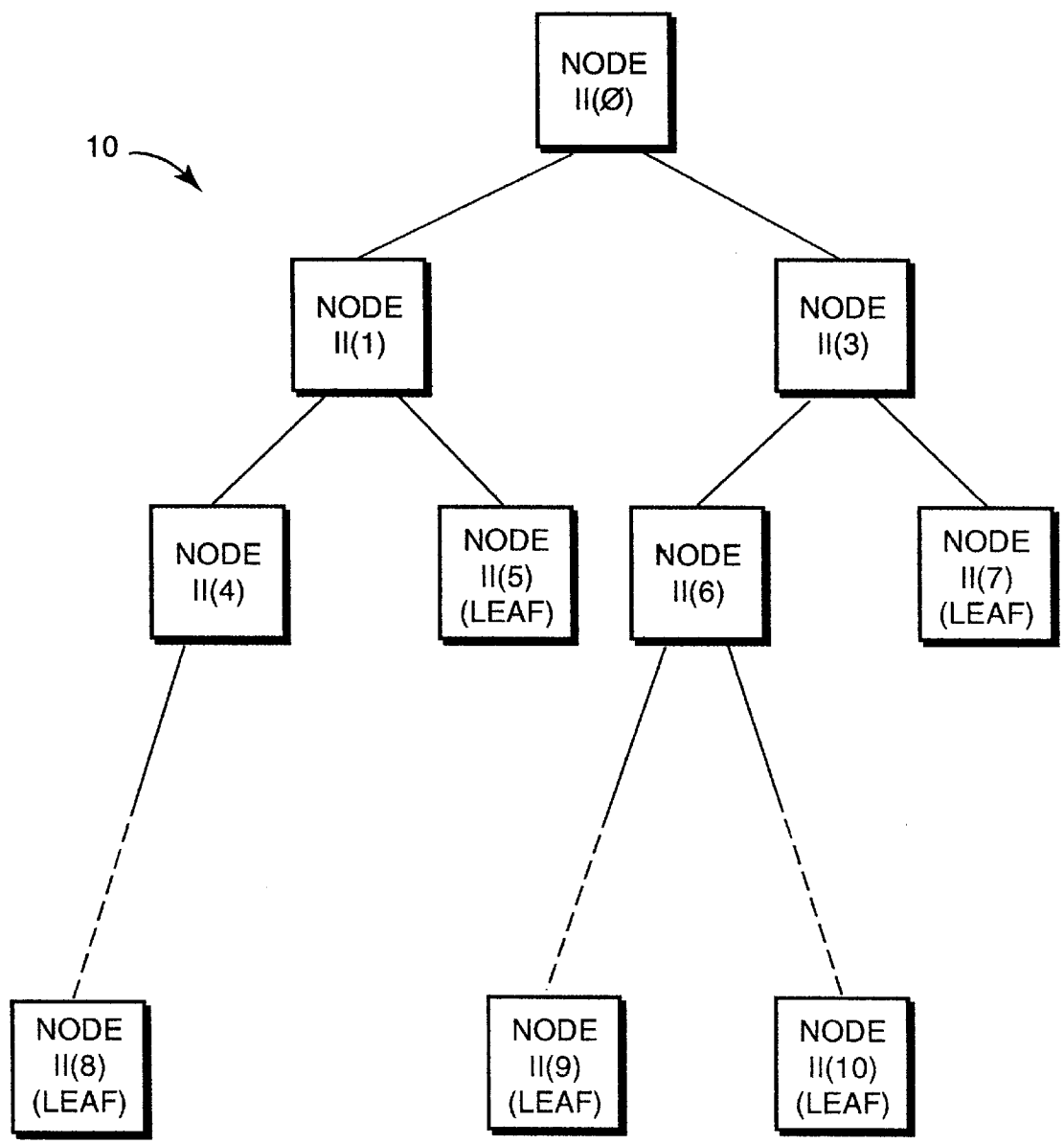
FIG. 1 is a diagram illustrating a classification/regression tree which is helpful in understanding the invention.

More specifically, and with reference to FIG. 1, a classification/regression tree 10 is a binary tree that includes a number of nodes extending from a root node 11(0) to a number of leaf nodes 11(??) (an individual node will generally be identified by reference numeral 11(a), where "a" is an integer index). The tree 10 is used to classify a record into one of a selected number of classes. A record includes a number of fields, one of which is identified as a "dependent" field or dependent variable, with the remaining fields being identified as "independent" fields or independent variables. The diverse values which the data contained in the dependent field can take on identify the "classes" into which the records can be classified, and the classification of each record is based on the values contained in the independent fields; otherwise stated, the tree 10 determines a value for the dependent field (the record's class), which is otherwise unknown, based on the contents of some or all of the independent fields.

Each node 11 (a) in the tree 10 represents a query to be applied to one of the independent fields, with the response to the query comprising a "yes" or a "no." An illustrative query may have the form "Is the value of field "X" (equal to, less than, or greater than) a selected value?", where field "X" is a field containing one of the independent variables and the selected value is a value determined by the tree generating system while generating the tree. If the answer to the query at a particular node is a "yes," the query at its left child node is applied, but if the answer is a "no," the query at the node's right child node is applied, and so the "selected value" used in each query, which is determined for the corresponding node during tree generation will be referred to herein as a "splits" value.

The queries of the tree are applied beginning with the root node 11(0); if the response of the root node's query is "yes," the left child node's question is then applied to the record; on the other hand, if the answer to the root node's query is "no," the right child node's query is then applied to the record. This process is repeated for the record at each node from the root node along a path through a series of intermediate nodes to the leaf node, and the response at the leaf node identifies the class into which the record should be classified; that is, the response at the leaf node provides an indication as to the value of the dependent field. The particular class identified by the classification/regression tree 10 for a particular record has an associated probability or confidence value indicating the likelihood that the record is, in fact, properly classified in the class identified by the tree 10.

The parallel classification/regression tree generating system described herein provides an arrangement, including a parallel computer system which will be described in connection with FIG. 2, for generating a classification or regression tree, such as the tree 10 depicted in FIG. 1, in response to a training database in which the records are presumed to be properly classified; that is, the training database includes records whose dependent fields contain correct values. In one embodiment, the parallel computer system used with the parallel classification/regression tree generation system includes a computer system such as the systems generally described in U.S. Pat. No. 5,333,268, issued Jul. 26, 1994, in the names of David C. Douglas, et al., entitled Parallel Computer System, and U.S. Pat. No. 5,353,412, issued Oct. 4, 1994, in the names of David C. Douglas, et al, entitled Partition Control Circuit For Separately Controlling Message Sending Of Nodes Of Tree-Shaped Routing Network To Divide The Network Into A Number of Partitions, both assigned to the assignee of the present application, and both incorporated by reference.

Figure 2:
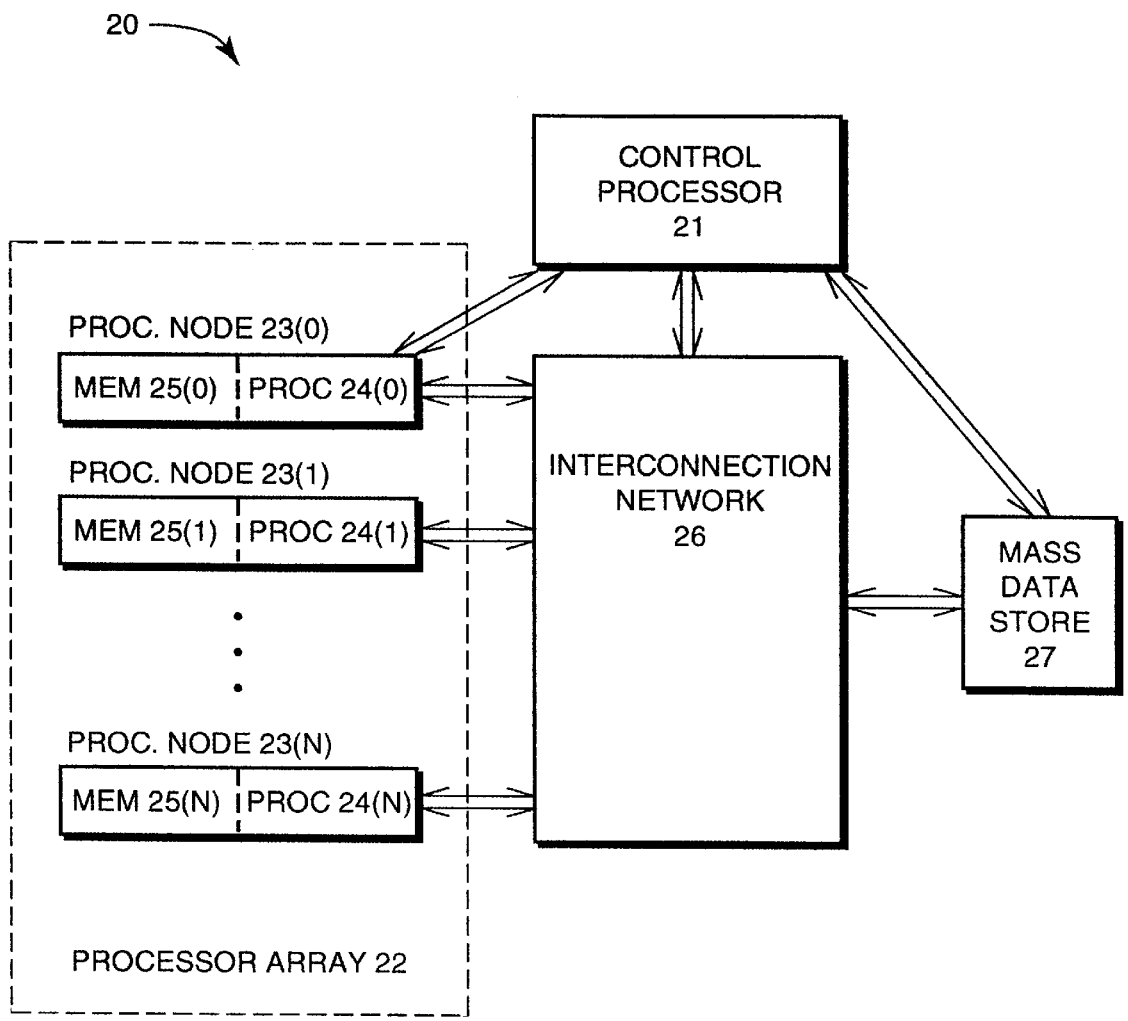
FIG. 2 is a general block diagram of a parallel computer system incorporating the new classification and regression tree generation system.

With reference to FIG. 2, parallel computer system 20 in one embodiment includes a control processor 21 which transmits commands to a processor array 22. The processor array 22 includes a plurality of processing nodes 23A through 23N [generally identified by reference numeral 23(i)], each including a processor 24(i) and a memory 25(i). The massively-parallel computer depicted in FIG. 2 operates generally in a "SPMD," or "single-program/multiple-data," manner. In SPMD, the control processor 21 may transmit commands to generally control the processing nodes 23(i). The processors 24(i) receive the commands and, in response, execute one or a series of instructions to process items of data in their respective memories 25(i). (It will be appreciated that the control processor 21 may comprise a separate element, or it may comprise one of the processing nodes 23(i) in the processor array 22.) The processing nodes 23(i) in the processor array 22 may also generate status information during their processing which they provide to the control processor 21. The control processor 21 may, in turn, use the status information in controlling the selection and timing of commands that it sends to the processing nodes 23(i). The processor array 22 also connects to interconnection network 26 which enables the processing nodes 23(i) to transfer data thereamong. Each processing node 23(i) is identified by an identifier, which also serves as an address in the interconnection network. When one processing node 23(I) needs to send data to another processing node 23(J), it may do so in a message which identifies the recipient processing node 23(J). The processing nodes 23(i) may also use the interconnection network 26 to synchronize their operations.

One embodiment of the massively-parallel computer also includes a mass data store 27 which stores data to be processed by the processing nodes 23(i) of the processor array 22 and data that has been processed thereby. In that embodiment, the processor array 22 and mass data store 27 transfer data therebetween through the interconnection network 26. It will be appreciated that a system in accordance with the invention may be implemented in a massively parallel computer which does not include a mass data store 27 connected to network 26 as depicted in FIG. 2, but instead data storage may be performed by some or all of the processing nodes 23(i).

Figure 3:
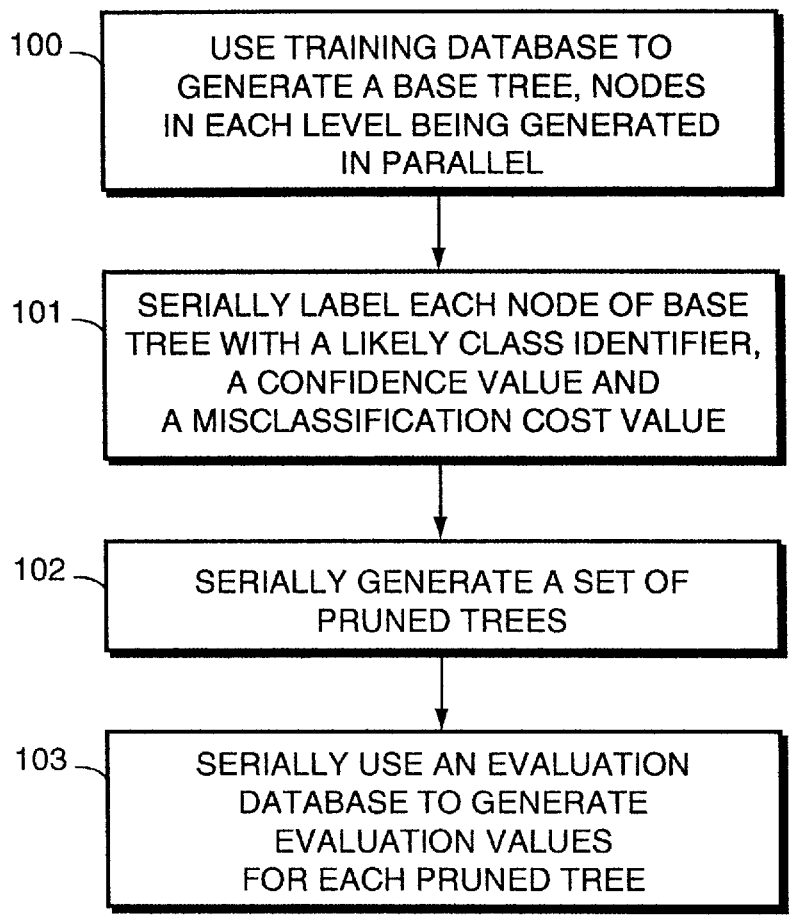
FIG. 3 is a general flow diagram depicting operations performed by the parallel computer system in connection with the classification and regression tree generation system.

The general operations performed by the parallel classification/regression tree generating system in generating a classification/regression tree such as tree 10 (FIG. 1) are depicted in FIG. 3. With reference to FIG. 3, the parallel classification/regression tree generating system initially uses a training database to construct a base tree (step 100). In that operation, the operations for which will be described in greater detail below, the processor array 22, under control of the control processor 21, will use the records in the training database to generate the nodes in the successive levels in the base tree in parallel. After generating the base tree, the system will use the training database to serially label each node of the base tree with its likely class, a confidence factor identifying the likelihood that the base tree node is properly associated with that class and a misclassification cost value indicating the cost associated with the misclassification of a record in the node (step 101, described in more detail below in connection with FIG. 16). Following step 101, the system will serially associate each node with a cost value set and use the base tree to generate a series of pruned trees (step 102, described in more detail below in connection with FIG. 17). After generating the pruned trees, the system uses properly classified records of an evaluation database to generate evaluation values for each of the pruned trees (step 103, described in more detail below in connection with FIG. 18). The evaluation values generally reflect, for each of the pruned trees, the number of records which were properly classified and the cost of the misclassification of the improperly classified records.

In generating the trees, the system makes use of a training database and an evaluation database, both of which contain records which have been properly classified. In addition, the system may make use of a set of "prior probability" values and a set of misclassification cost values, both of which will be referenced in the following. In general, each prior probability value identifies the proportion of members of each class in a population of entities, of which the training database may comprise a subset. If it is known a priori that, in the training database, the number of records associated with each class differs from the number which would likely be correctly allocated to a class, the prior probability values can be used to correct for this difference. In addition, the misclassification cost values will identify a "cost," however measured, of classifying a record in one class when it is properly classified in another class. The misclassification cost values enable the evaluations of the pruned trees (step 103) to reflect the fact that, depending on the particular applications to which the tree 10 generated by the system are to be put, certain improper classifications may be more detrimental than other improper classifications.

The operations performed by the parallel classification/ regression tree generating system in constructing a base tree from the training database (step 100, FIG. 3) will be described in detail in FIGS. 4A through 15. The system makes use of the processing nodes 23(i) of the processor array 22 to generate the base tree from the training database. In brief, the processing nodes 23(i) operate in a series of iterations, in successive iterations identifying the split values for the tree nodes 11(a) for nodes of successive levels in the tree. In each iteration, the processing nodes 23(i) determine split values for all of the nodes in the tree at a particular level. Thus, during a first iteration, the processing nodes 23(i) determine the split value for the root node 11(0), and in each of a series of subsequent iterations, the processing nodes 23(i) determine split values for all of the nodes in successive levels in the tree 10 at a particular level. In that operation, the classification/regression tree generating system makes use of the entire training database.

Generally, in determining a splits value for each node, the classification/regression tree generating system identifies a splits value for each of the independent variables. Each splits value is selected to decrease the diversity and maximize the likelihood that records which are properly classified in particular classes will sequence appropriately through the tree.The system the independent variable which provides the greatest decrease in diversity as the independent variable for that node.

Figure 4A:
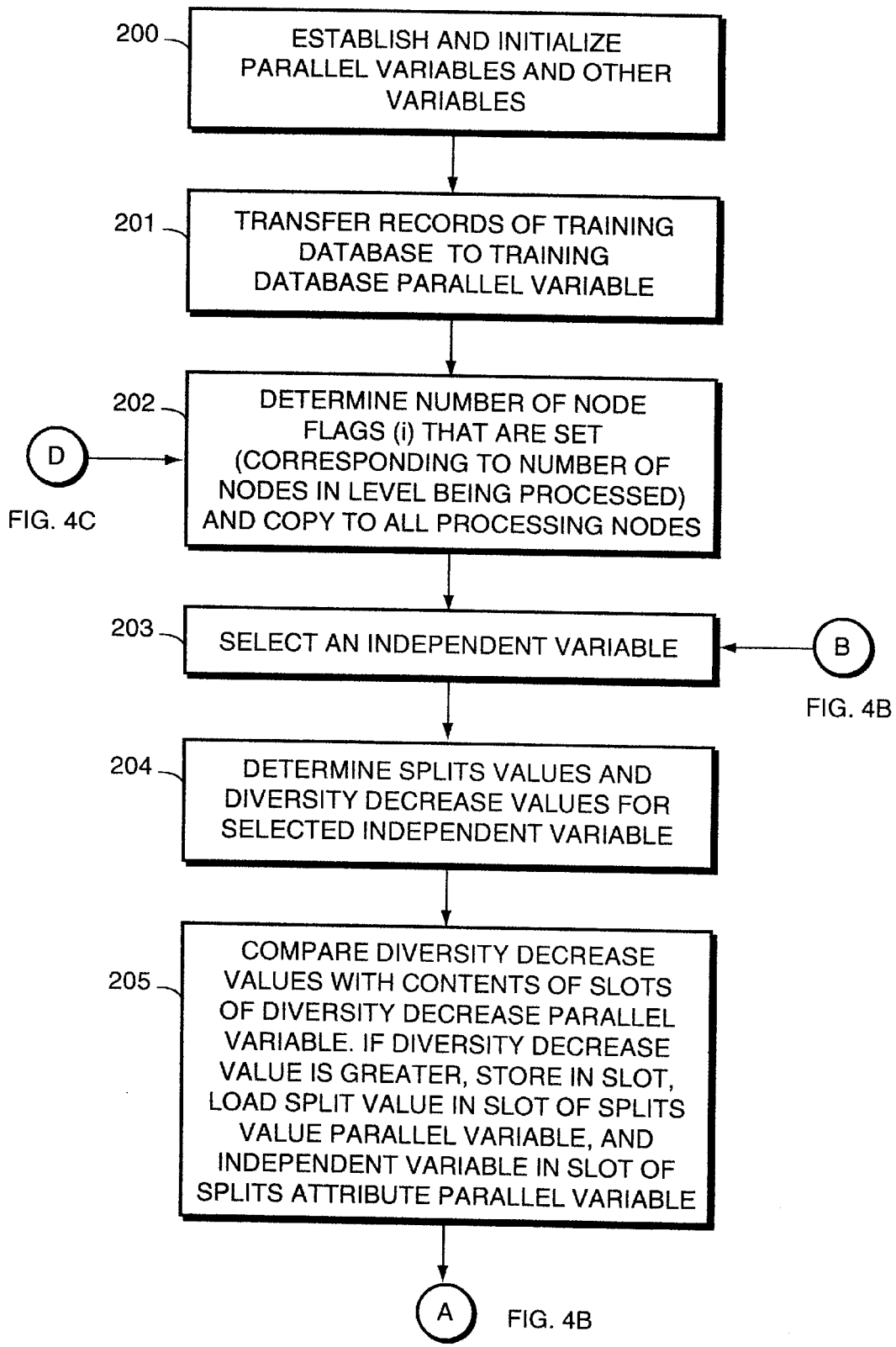
FIGS. 4A, 4B and 4C are detailed flow diagrams depicting operations performed in connection with one aspect of the operations depicted in FIG. 3, in particular, generation of a base classification/regression tree.
Figure 4B:
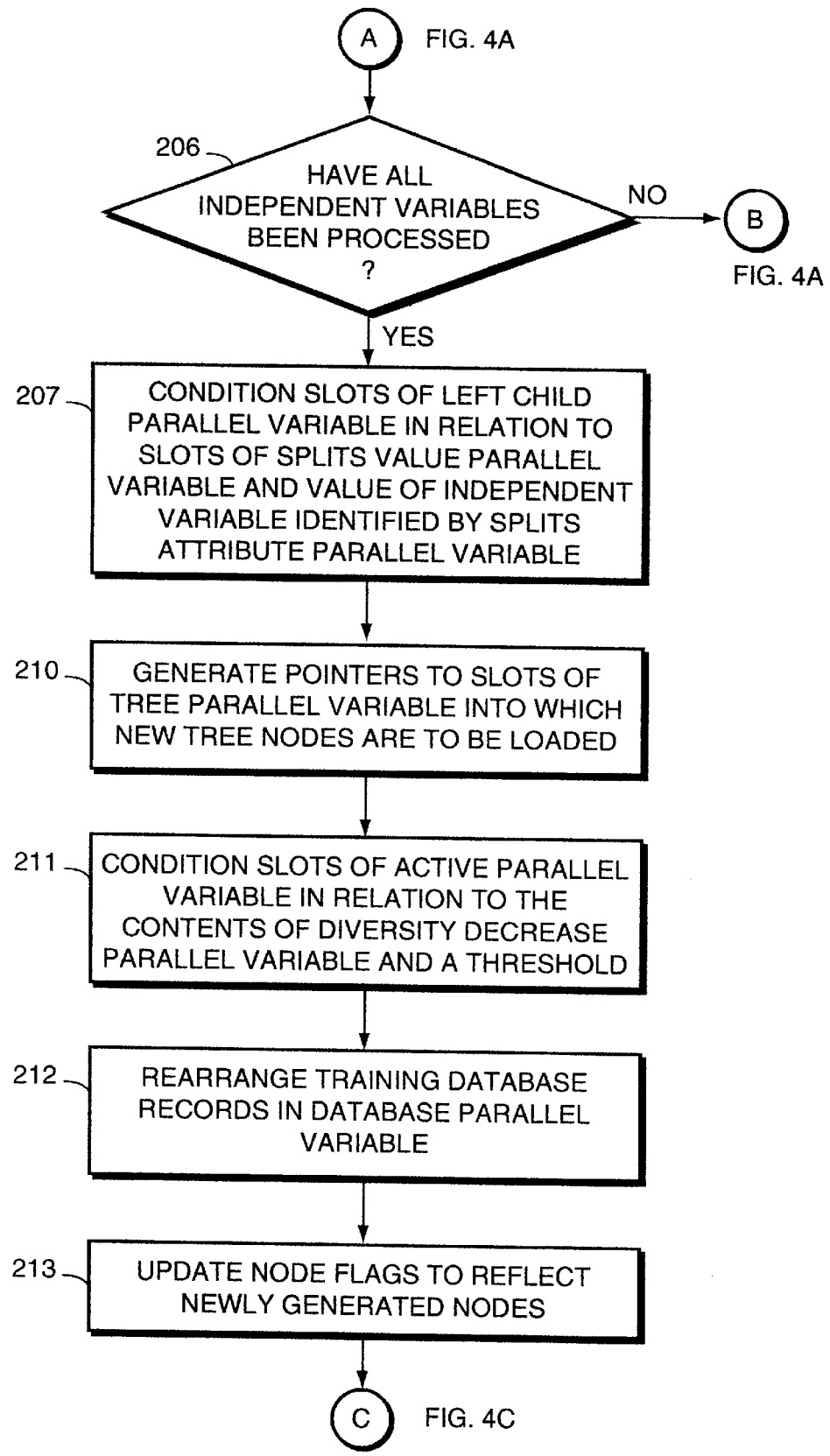
Figure 4C:
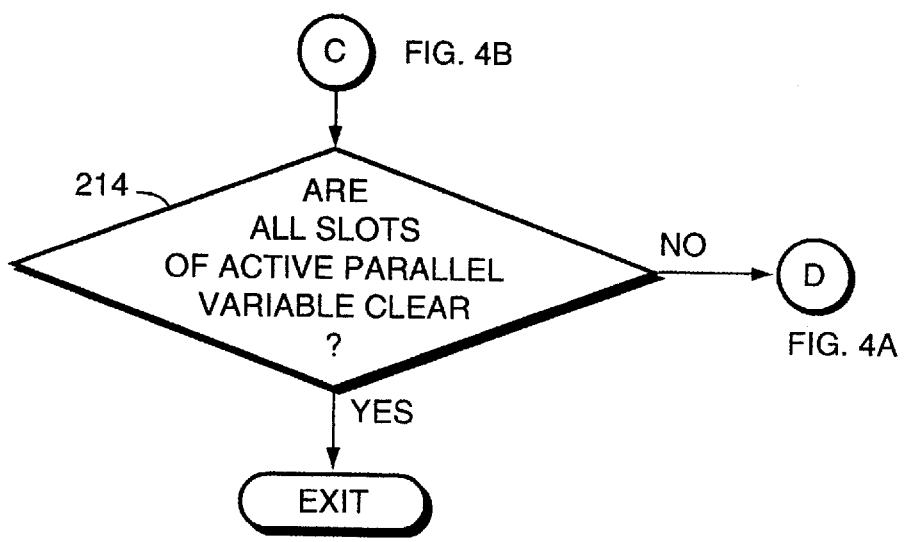

More specifically, and with reference initially to FIG. 4A, in a series of initialization steps, the system first establishes several parallel variables and other variables that it will use in generating a classification/regression tree (step 200). In one embodiment, a parallel variable is a variable comprising a plurality of data elements, similar to a one-dimensional array, which are established in "slots" comprising memory locations extending across the memories 25(i) of the processing nodes 23(i), which are generally processed or used in parallel by the processing nodes 23(i). One such parallel variable comprises a training database parallel variable 30, which the processing nodes 23(i) will use to receive the training database. With reference to FIG. 5, the training database parallel variable 30 comprises a plurality of slots DB(0) through DB(N) (generally referenced herein by reference numeral "DB(i)," where "i" is an integer from zero to "N"), each of which receives one record of the training database. Each record includes the value of the dependent variable, which generally defines the appropriate class for the record, as well as the values of all of the independent variables, and each slot DB(i) includes fields DB(i)(0) through DB(i)(J) (generally referred to herein by reference numeral "DB(i)(j)" where "i" is an integer from zero to "N" and "j" is an integer from zero to "J") for the various variables in a record.

Figure 6:
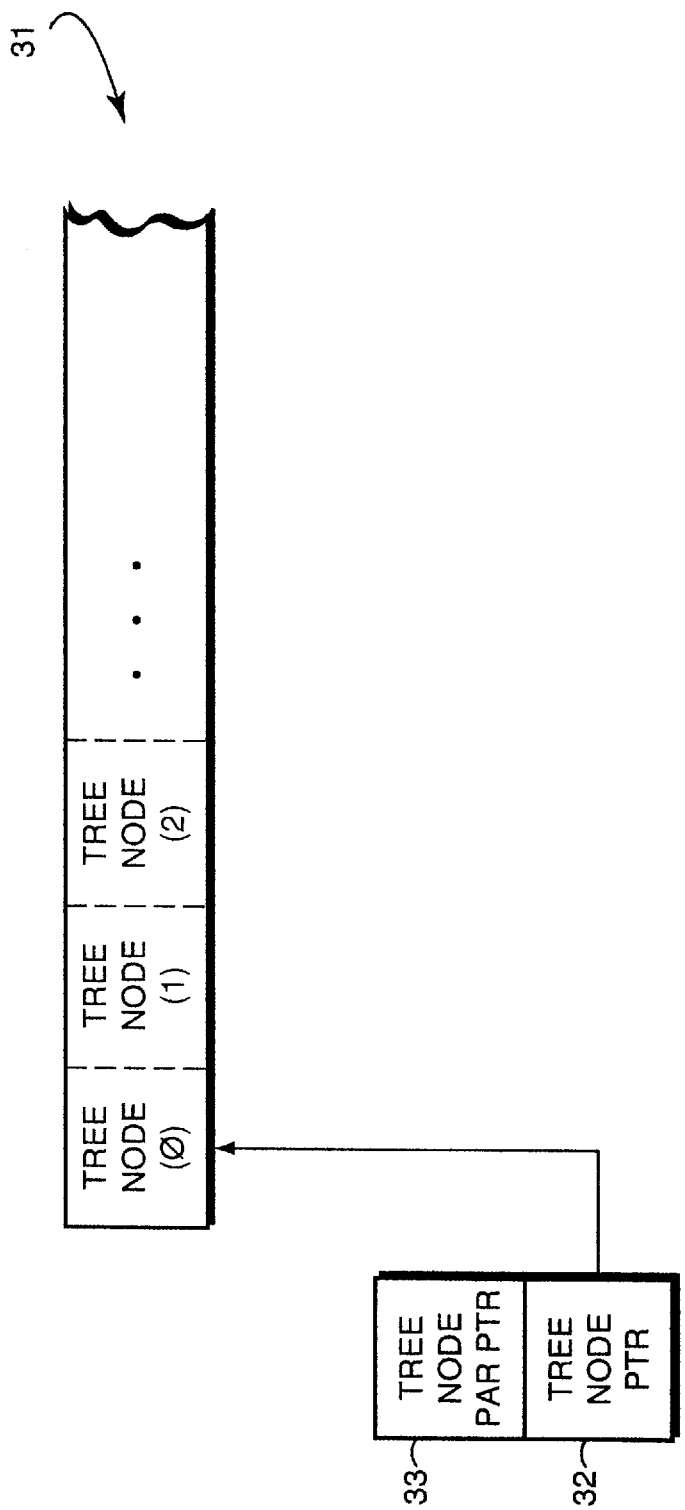

In addition, the processing nodes 23(i) establish a tree parallel variable 31 which is to contain tree node information defining the nodes of the tree. With reference to FIG. 6, the tree parallel variable 31 includes a series of slots TREE NODE (0) through TREE NODE (K) (generally referred to herein as TREE NODE(k), where "k" is an integer from zero to "K). Each slot TREE NODE(k) will contain information for a node 11(a) in the classification/regression tree 10 to be generated by the system, including (i) the identification of the independent variable to be tested by the node, as well as the split value for that independent variable, and (ii) information to be used locate the node among other nodes in the tree, in particular pointers to the slots for the node's parent and children in the tree. The first slot TREE NODE(0) will be associated with the root node 11(0) in the classification/ regression tree to be generated by the system. The system further establishes a tree node slot pointer 32 to point to the first currently-unfilled slot in the tree node parallel variable 31, which initially is slot TREE NODE(0), which is associated with the root node 11(0). In addition, the system establishes a tree node parent slot pointer 33 to point to the parent of the first currently-unfilled slot in the tree node parallel variable; at this point, since the first currently-unfilled slot is the root node in the classification/regression tree to be generated, there is no parent node for the tree node parent slot pointer, and so the system loads the value "No_Node" into the tree node parent slot pointer.

The processing nodes 23(i) further initially establish a number of other parallel variables, including an active parallel variable 34 (FIG. 7) and a node flag parallel variable 35 (FIG. 8). The node flag parallel variable 35 (FIG. 8) has a plurality of slots NODE FLAG (0) through NODE FLAG (N) (generally referred to as NODE FLAG (i), where "i" is an index from zero to "N") each associated with a correspondingly-indexed slot DB(i) of the training database parallel variable 30. As noted above, after generating splits values for the nodes at a particular level, the parallel classification/regression tree generation system reorganizes the records in the slots DB(i) of the database parallel variable 30 (FIG. 5) so that records that would, based on the splits values determined for the particular level, be directed to a particular node in the next level are in successive slots DB(i) of the database parallel variable 30. For example, after the parallel classification/regression tree generation system determines a splits value for the root node 11(0) (FIG. 1), it identifies records that would be directed to the left child node 11(1) and records that would be directed to the right child node 11(2). The system transfers those records that would be directed to the left child node 11(1) to the low-order slots DB(0) through DB(L) of the database parallel variable 30, and those records that would be directed to the right child node 11(2) to the high order slots DB(L+1) through DB(N). The parallel classification/regression tree generation system performs similar operations in successive iterations, generally in each iteration further dividing the series of slots DB(x) through DB(z) containing records assigned to a particular node into two smaller series DB(x) through DB(y) and DB(y+1) through DB(z) each associated with one of the node's respective child nodes. The node flag parallel variable 35 is used, in each iteration, to distinguish the slots DB(i) of the database parallel variable 30 which contain records for the nodes 11(i) of the classification/regression tree 10 that the parallel classification/regression tree generation system establishes during an iteration. That is, if a NODE FLAG (I) is set, the correspondingly-indexed slot DB(I) of the database parallel variable contains the first record for a node, and successively-indexed slots DB(I+1), DB(I+2), . . . , up to but not including a slot DB(I+x) for which the NODE FLAG (I+x) is set, contain records for a particular node established during the iteration. Since, initially, all records are assigned to the root node 11(0), the parallel classification/regression tree generation system initially sets the low-order NODE FLAG (0) and clears all of the other node flags NODE FLAG (1) through NODE FLAG (N).

The active parallel variable 34 (FIG. 7) has a plurality of slots ACT(0) through ACT(N) (generally referred to as "ACT(i)", "i" an index from zero to "N"), each associated with a correspondingly-indexed slot DB(i) of the training database parallel variable 30. Each slot ACT(i) can hold a set value indicating that the correspondingly-indexed slot DB(i) is "active", or a clear value indicating that the slot DB(i) is "inactive." As described above, as the parallel classification/regression tree generation system determines split values for nodes at successive levels in the classification/regression tree, it determines, for each node, whether child nodes should be created based on a determination that the split value determined for the node provides, for the child nodes, a decrease in the level diversity for a dependent variable that is above a selected threshold level. If the decrease in the level of diversity does not exceed the selected threshold, the node is treated as a "leaf" of the classification/regression tree, essentially associated with the class corresponding to the most prevalent value of the dependent variable in records in the corresponding slots DB(i). In that case, the parallel classification/regression tree generation system does not create child nodes, and essentially ignores the slots DB(i) in succeeding iterations as it generates subsequent levels in the tree. To accomplish this, the parallel classification/regression tree generation system clears the ACT (i) active slots with indices "i" corresponding to the slots DB(i) associated with the node.

In addition to the structures described above, the parallel classification/regression tree generation system further generates and initializes a number of other structures. The processing nodes 23(i) establish a left child parallel variable 36 (FIG. 9) and a right child parallel variable 37 (FIG. 10) each having a plurality of slots, respectively LC(i) and RC(i), each associated with a correspondingly-indexed slot DB(i) of the training database parallel variable (step 116). The parallel classification/regression tree generation system uses the left child parallel variable 36 and the right child parallel variable 37 in generating splits values as described below in connection with FIG. 15.

The processing nodes 23(i) also establish a diversity decrease parallel variable 40 (FIG. 11), a splits attribute parallel variable 41 (FIG. 12), a splits value parallel variable 42 (FIG. 13) and a left child parallel variable 43 (FIG. 14) (step 117). These parallel variables 40 through 43 include respective slots DIV DEC (i), SPL ATR (i), SPL VAL (i) and LEFT CHILD (i), each associated with a correspondingly-indexed slot DB(i) of the training database parallel variable 30. During each tree-level node generation iteration, the parallel classification/regression tree generation system identifies the independent variable(s) and splits value(s) to be used for the nodes of a particular level by determining a splits value and diversity decrease for each of the independent variables, and selecting for each node in the tree level the independent variable and splits value that provides the greatest diversity decrease. The processing nodes 23(i) perform this operation by, in a series of "independent variable test iterations" nested within the tree-level node generation iteration (the operations performed in connection with one "independent variable test iteration" will be described below in detail in connection with FIG. 15), generating a splits value for the independent variable and a diversity decrease value therefor, determining whether the diversity decrease values generated for the current independent variable (which may differ for the various slots of the training database parallel variable 30 associated with the diverse nodes 11(i)) are larger than the values in the respective slots DIV DEC (i) of the diversity decrease parallel variable 40 (FIG. 11) and, if so, loading the diversity decrease values in the respective slots DIV DEC (i), the identification of the independent variable in the respective slots SPL ATR (i) of the splits attribute parallel variable 41, and the splits value for that independent variable (which may also differ for the various slots of the training database parallel variable 30 associated with the diverse nodes 11(i)) in the respective slots SPL VAL (i) of the splits value parallel variable 42. In addition, the processing nodes 23(i) will condition flags in their respective slots LEFT CHILD (i) of the left child parallel variable 43 if the record in the correspondingly-indexed slot DB(i) of the training database parallel variable 30 would, based on the record's independent variable value and the splits value determined during the independent variable test iteration, be properly assigned to the left child node or the right node.

After a series of independent variable test iterations, in which these operations have been performed on all of the independent variables, the various slots of the diversity decrease parallel variable 40, splits attribute parallel variable 41, splits value parallel variable 42 associated with the nodes at the particular level that is being generated during the tree-level node generation iteration will identify the independent variables and associated splits values for the respective nodes in the level that provided the largest decrease in diversity. In addition, after the series of independent variable test iterations, the flags in the slots of the LEFT CHILD (i) will identify, for each node, the slots DB(i) of the training database parallel variable 30 containing records for each node's left and right child nodes, which the processing nodes use to generate slot identifiers to re-order the records among the slots DB(i) so that, if records associated with a node are in slots DB(x) through DB(z), the records associated with the node's left child node are in a low-order-indexed series of slots DB(x) through DB(y) and the records associated with the node's right child node are in the high-order-indexed series of slots DB(y+1) through DB(z). After that has been accomplished, the processing nodes 23(i) can initiate a subsequent tree-level node generation iteration to generate a next level of nodes in the classification/regression tree.

More specifically, after the processing nodes 23(i) have established the parallel variables described above in connection with FIGS. 5 through 14, the parallel classification/regression tree generation system transfers the records of the training database to the training database parallel variable 30 (step 201) and loads them into the respective slots DB(i). In this operation, the training database will generally be stored in the mass data store 27, and the control processor 21 may enable the mass data store 27 to transfer the records to the processing nodes 23(i) of the processor array 22 through the interconnection network 26.

The processing nodes 23(i) then begin the first tree-level node generation iteration to begin generating the node splits value and independent variable identification for one of the levels of the classification/regression tree, in the first iteration case the root level. Initially, the processing nodes 23(i) will determine the number of slots NODE FLAG (i) of the node flag parallel variable 35 which are set and copy that value to all of the processing nodes 23(i) as a "number of new nodes" value (step 202). As noted above, the number of slots NODE FLAG (i) which contain a set value corresponds to the number of nodes in the level, and that value also is used to adjust the value of the splits slot pointer 32 and splits parent slot pointer 33 (FIG. 6) to identify the first free slot of the tree parallel variable 31. In the embodiment of the parallel classification/regression tree generating system using the parallel computer system described in the aforementioned Douglas, et al. patents, the processing nodes can perform the operations in step 202 by performing a "reduce" operation as described therein.

Thereafter, the processing nodes 23(i) begin a first independent variable test iteration. The processing nodes 23(i) initially select one of the record fields, other than the field containing the dependent variable (step 203). The processing nodes 23(i) then perform a series of operations, which are described below in connection with FIG. 15, to determine a splits value for the selected independent variable and contemporaneously a diversity decrease value (step) 204). The particular operations performed by the processing nodes 23(i) in step 203 depend on the particular type of tree 10 being generated, and in particular on whether the tree will be used for classification or regression. In any case, it will be appreciated from the description below that, in general for the each level in the tree, splits values and diversity decrease values that are generated for the diverse nodes in the level will generally differ. Normally, the processing nodes 23(i) will generate one splits value and one diversity decrease value for each node, that is, for each series of slots DB(i) of the training database parallel variable 30 which are assigned to a particular node. In step 204, the processing elements 23(i) will, for each slot DB(i) of the training database parallel variable 30, compare the diversity decrease value generated for the node associated with the slot during the independent variable test iteration to the contents of the correspondingly-indexed slot DIV DEC (i) of the diversity decrease parallel variable 40 (step 204) and, if the diversity decrease value generated during the iteration is greater than the contents of the slot DIV DEC (i), it will store the diversity decrease value in the correspondingly-indexed DIV DEC (i) slot, the identification of the field used for the independent variable test iteration in the SPL ATR (i) slot of the splits attribute parallel variable 41, and the splits value in the SPL VAL (i) splits value slot of the splits value parallel variable 42 (step 205). It will be appreciated that, during the first iteration, the training database records in all of the slots DB(i) of the training database parallel variable 30 will be assigned to the single root node 11(0) of the classification/regression tree (FIG. 1), and so all of the SPL ATR (i) splits attribute slots of the splits attribute parallel variable 41 will contain the same splits attribute identification and all of the SPL VAL (i) splits value slots of the splits value parallel variable 42 will contain the same splits value, namely, the value that was loaded in step 205.

Following step 206, the processing nodes sequence to step 207 to condition the slots LEFT CHILD (i) of the left child parallel variable 43. In that operation, each processing node 23(i) compares the splits value in each slot SPL VAL (i) to the value contained in the selected independent variable field DB(i)(j) of the training database record in the slot DB(i) with the same value of index "i," and loads a set value into the LEFT CHILD (i) slot if the value contained in the splits value slot SPL VAL (i) is less than the value in the field DB(i)(j), and otherwise loads a clear value therein. The value in the LEFT CHILD (i) slot identifies whether the training database record in the slot DB(i) is to be assigned to the left child node or to the right child node in the next level in the tree; if the LEFT CHILD (i) slot contains a set value (which occurs if the value of the independent field DB(i)(j) of the slot DB(i) is less than the value in the splits value slot SPL VAL (i) of the splits value parallel variable 42), the training base record will be assigned to the left child; otherwise, it will be assigned to the right child.

Following step 207, the processing nodes 23(i) determine whether they have performed steps 201 through 206 in connection with all of the independent fields DB(i)(j) (step 207). If not, they return to step 201 to select another field and perform the same operations in connection with another independent field. In that operation, the processing nodes 23(i) will generate a splits value and diversity decrease value for the independent field (step 204) and compare (i) the diversity decrease value determined during this iteration for the independent field currently being processed to (ii) the diversity decrease value determined during the previous iteration for the first independent field (step 205). If the diversity decrease value for the independent field currently being processed is greater than the diversity decrease value generated previously, the processing nodes 23(i) store the diversity decrease value generated during this iteration, along with the identification of the independent field and the splits value in the respective slots of the diversity decrease parallel variable 40, the splits attribute parallel variable 41 and the splits value parallel variable 42 (step 205), and conditions the values in the respective slots of the left child parallel variable 43 (step 205) as described above, and returns to step 206.

The processing nodes 23(i) repeat the operations described above in connection with steps 201 through 206 for each independent variable DB(i)(j). When the processing nodes 23(i) make a positive determination in step 207 determining that all of the independent fields, that is, all fields DB(i)(j) other than the dependent field, have been selected, it will be appreciated that the slots SPL ATR (i) and SPL VAL (i) of splits attribute and splits value parallel variables 41 and 42 will identify, respectively, the independent field and the splits value which provided the largest diversity decrease value. In addition, the slots DIV DEC (i) of the diversity decrease parallel variable 40 will identify that diveristy decrease value. Furthermore, the slots LEFT CHILD (i) of the parallel variable 43 will indicate whether the training database records of the correspondingly-indexed slots DB(i) of the training database parallel variable 30 are associated with the left child node or the right child node of the classification/regression tree being generated.

Following a positive determination in step 207 the processing nodes 23(i) sequence to a series of steps to generate one or more new slots TREE NODE (i) for the tree parallel variable 31. Generally, in that operation, the processing node or nodes 23(i) whose NODE FLAG (i) are set will generate node data for a series of new slots TREE NODE (i) of the tree parallel variable 31, and successively-indexed processing nodes 23(i) will load them into a series of successively-indexed slots TREE NODE (i), using the tree node pointer 32 and the contents of the NODE FLAG (i) slots of the node flag parallel variable 35. Each slot TREE NODE (i) so created includes pointers to the slots for the node's parent and children, if any, and in addition includes the identification of the independent variable to be tested by the node and the splits value, provided by the contents of the splits attribute parallel variable 41 and the splits value parallel variable 42.

In that operation, the processing nodes 23(i) will also determine whether the diversity decrease value in the slots DIV DEC (i) of the diversity decrease parallel variable 40 is greater than a predetermined threshold value. If not, the node associated with the slots DIV DEC (i) will be assigned as a leaf, rather than as a node, of the classification/regression tree being constructed. In that case, the splits attribute(s) and splits value(s) just determined will not be used as defining a new tree node 11(i), and so the processing nodes 23(i) will clear the corresponding-indexed slots SPL ATR (i) of the splits attribute parallel variable 41. In the first iteration, since the root node 11(0) is being processed, it will be assumed that the diversity decrease value in the slots DIV DEC (i) of the diversity decrease parallel variable 40 is greater than the predetermined threshold value, and so processing will continue with the assumption that the records in slots DIV DEC (i) will continue as a node.

Following step 207, the processing nodes 23(i) will generate pointers to slots of the tree parallel variable 31 into which new tree nodes will be loaded (step 210). In that operation, the processing nodes 23(i) identify the ones of the NODE FLAG (i) slots which are set, and, for those whose NODE FLAG (i) slots are set, obtain the value of the splits parent slot pointer SPS and copy it to a parent slot identifier. The value of the parent slot identifier will be used for each tree node in the tree parallel variable 31 to identify the tree node associated with the parent node 11(i) in the tree 10; it will be appreciated that, during the first iteration the splits parent slot point SPS and accordingly the parent slot identifier will contain a code value that indicates that the there is no parent node. The processing nodes 23(i) then determine the number of NODE FLAG(i) slots which are set, which corresponds to the number of nodes generated during the previous iteration, if any; it will be appreciated that, during the first iteration, one NODE FLAG(i) slot will be set, namely, NODE FLAG(0), since the database records DB(i) defined only a single node. The processing nodes 23(i) then increment the value of the splits parent slot pointer by the number of NODE FLAG (i) slots which are set.

Following step 210, the processing nodes 23(i) then clear the active flags ACT (i) associated with the database records DB(i) for which the diversity decrease value DIV DEC (i) was below a selected decrease threshold value (step 211). For a particular node 11(i) established during a previous iteration, if any, unless the best diversity decrease value associated with the node was at least at the diversity decrease threshold level, that node is determined to be a leaf and the node and database records DB(i) associated therewith will be ignored during subsequent iterations. The ACT(i) active flags are used to identify the nodes and database records DB(i) which will be used to generate a tree node during each iteration; if an ACT (i) flag is set, the correspondingly-indexed database record DB(i) and other data structures 34 through 43 will be used to generate a tree node during that iteration; otherwise they will be ignored.

Following step 211, the processing nodes rearrange the database records in the slots DB(i) for which the ACT(i) active flags are set (step 212). For those database records DB(i) whose indices correspond to set ACT (i) active flags, the processing nodes rearrange the database records associated with each node so that the database records for which the selected independent variable is equal to or below the splits value for that node are in the database record slots DB(i) of lower indices "i" associated with the node, and the database records for which the selected independent variable is above the splits value for that node are in the database record slots DB(i) of higher indices "i" associated with the node. In that operation, since the index "i" associated with each set NODE FLAG (i) identifies the first database record slot DB(i) associated with a node (the ones of the NODE FLAGs (i) which are set during each iteration essentially demarcate segments of the database record slots DB(i) whose contents are associated with the nodes 11(i) of the tree 10 being processed at during the iteration.), the processing nodes identify the indices "i" for which the NODE FLAG (i) are set, and copy the value "i" to associate the value with other database record slots DB(i) that are associated with the node. Within each segment defined by the set NODE FLAGs (i), the processing nodes 23(i) generate addresses for use in transferring the database records to be associated with the left child by performing a segment-add of the LEFT CHILD (i) flag up the segment, thereby to associate with each database record slot DB(i) a value corresponding to the number of database record slots of lower index "i" that are associated with the left child. For each database record slot DB(i) which contains a database record to be associated with the left child, the processing nodes 23(i) can use this value to identify the database record slot DB(i) to which the database record is to be transferred by adding the value so generated to the index "i" of the NODE FLAG (i) which was earlier copied for the segment.

In addition, it will be appreciated that the value generated during the segment-add associated with the database record slot DB(i) having the highest index "i" corresponds to the total number of database records to be associated with the left child for the node. Accordingly, the processing nodes 23(i) copy this "left child number" value to associate it with all of the database record slots DB(i) in the segment. The processing nodes add the "left child number" value to the index "i" associated with the NODE FLAG (i) defining the node, which sum is a right child base index value corresponding to the index of the first database record slot that will be associated with the right child. The processing nodes 23(i) accordingly perform a second segment add tip the segment, in this case using the right child flags RC(i) thereby to associate with each database record slot DB(i) a value corresponding to the number of database record slots of lower index"i" that are associated with the right child. For each database record slot DB(i) which contains a database record to be associated with the right child, the processing nodes 23(i) can use this value to identify the database record slot DB(i) to which the database record is to be transferred by adding the value so generated to the right child base index value which was earlier generated.

The values generated identify, for each database slot DB(i), the database slot to which the present contents should be transferred to ensure that, for each node, the database records to be associated with the left child will be in the lower-indexed database slots DB(i) associated with the node, and the database records to be associated with the right child will be in the higher-indexed database slots DB(i). Accordingly, the processing nodes 23(i) use the values to reorder the contents of the database slots (step 212). In addition, the processing nodes 23(i) condition the NODE FLAGs (i) to identify the newly-formed nodes (step 213). It will be appreciated that, since the database records associated with the left child are in the node's lower-indexed database record slots DB(i), the NODE FLAG (i) identifying the segment associated with the left node is already set. However, the NODE FLAG (i) identifying the segment of database record slots DB(i) associated with the right child node is not set, and the processing nodes 23(i) can use the value to identify the indeces "i" of the NODE FLAGs (i) to be set to identify the right child nodes (step 213).

After step 213, the processing nodes 23(i) have performed the operations to generate, in parallel, the nodes 11(i) of the tree 10 that are associated with one child node level. The processing nodes 23(i) can thereafter return to step 202 to repeat the operations to generate nodes at the next lower level. The processing nodes 23(i) will repeat the operations depicted in FIGS. 4A through 4C until they determine that none of the ACT (i) active flags are set, at which point the decrease diversity for all of the nodes 11(i) in the lowest level is below the predetermined diversity decrease threshold value. At that point, the processing nodes have generated a trial tree, which will be pruned and evaluated as described below.

As described above in connection with step 204, the processing nodes 23(i) in that step generate splits values for each of the nodes 11(i) being processed in a particular level in tree 10 in parallel. The operations performed by the processing nodes in that operation will be described in connection with FIG. 15.

In generating a splits value for an independent variable in the selected field DB(i,j) of the records in the database parallel variable 30 (FIG. 5), in connection with the dependent variable, the processing nodes 23(i) initially perform a segmented sort operation using the set NODE FLAGs(i) in the node flag parallel variable 35 as the segment flags (step 250). Following step 250, for the records associated with each node 11(i) of the tree 10 being generated, the records are sorted in order according to the values of the independent variable. The processing nodes 23(i) then, for each independent variable value and each node 11(i), performs a segmented sort with the records in the database parallel variable 30 (step 251). In step 251, the segments are defined for each tree node 11(i), and within each section of the segment associated with each unique value of the dependent variable, the records are in order according to their independent variables. The processing nodes 23(i) then establish segments for each of the values of the dependent variable (step 252).

After establishing the dependent variable segments in step 252, the processing nodes 23(i) identify, for each slot DB(I) of the database parallel variable 30, the number of lower- and higher-indexed slots in the node, and loads them into the correspondingly-indexed slots LC(I) and RC(I) left child and right child parallel variables 36 and 37 (step 253). In that operation, the processing nodes perform a segment scan addition up the segment using the value "one" to generate the number of lower-indexed slots DB(i) in the segment. To generate the number of higher-indexed slots DB(i) in the segment, the processing nodes perform a segment scan addition down the segment also using the value one, and subtracting the value "one" from the segment scan.

Following step 253, the processing nodes 23(i) perform another sort operation in which they again sort the records in the slots DB(i) associated with each node according to the values of the independent variable (step 254). The processing nodes then establish segments associated with each value of the independent variable (step 255) and generate a probability value P(i,j) for each tree node indicating the probability that the node is properly classified each of respective classes associated with the values of the dependent variable (step 256). In that operation, the processing nodes 23(i) receive the prior probabilities for the various classes and multiply the values in their LC(i) and RC(i) slots by the ratio of the respective prior probability values to the number of records in the training database in the corresponding class. The processing nodes 23(i) then generate various statistics (step 257), including (a) a "total" value "t(i)" associated with each slot DB(i) corresponding to the sum of the contents of the correspondingly-indexed slots LC(i) and RC(i) of the left and right child parallel variables 36 and 37, (b) left and right child statistics for each of the segments defined by the differing values of the independent variable for each node as the scan sum, down the segment defined by the independent variable, of the contents of each of the LC(i) and RC(i) slots having indices corresponding to the indices of the slots DB(i) in the segment, to generate values L and R. The processing nodes 23(i) then scan copy the values for L and R up the respective segments, and generate additional statistics, including T as the sum of L and R, normalized left and right child values in which the contents of each slot LC(i) is normalized by the value L and the contents of each slot RC(i) is normalized by the value R, and each value t(i) is normalized by the value T.

After generating the statistics in step 257, the processing nodes 23(i) use the statistics to generate a diversity decrease value for each of the values of the independent variable, for each node 11(i) (step 208). In that operation, the processing nodes generate the diversity decrease value as $I(t)-(L/T)*I(L)-(R/T)*I(r)$, where "I(x)" is a selected diversity decrease metric generated using the values "t,", "l" and "r" in a conventional manner. The processing nodes 23(i) then select, for the series of slots DB(i) associated with each tree node 11(i), the value of the independent variable providing the best diversity decrease value as the splits value for that independent variable. The processing nodes 23(i) repeats the operations in connection with each independent variable, and select, for each tree node 11(i) the independent variable (which may be different for each tree node) and the splits value which provides the best diversity decrease value.

Figure 15A:
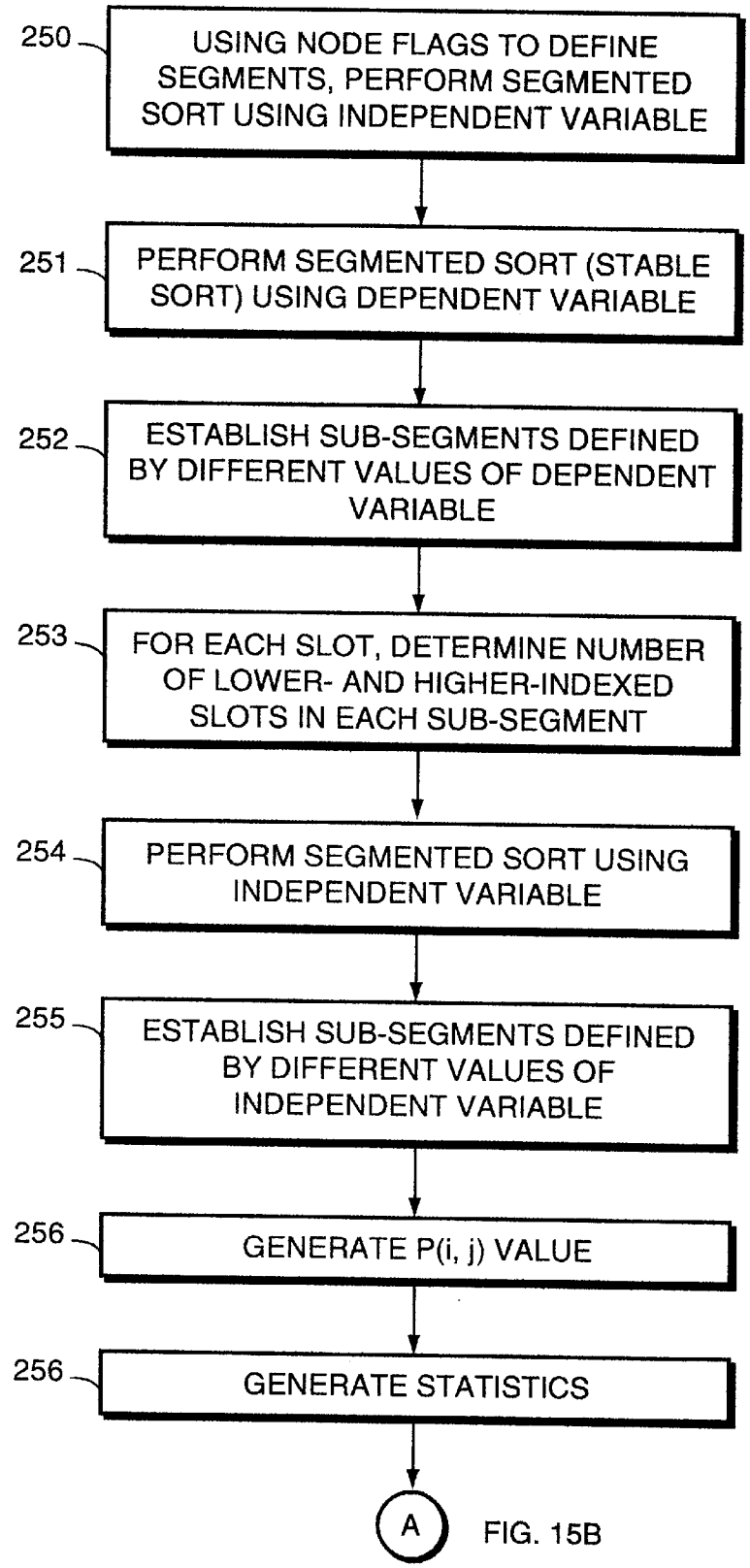
FIGS. 15A and 15B are detailed flow diagrams depicting operations performed in connection with one aspect of the operations depicted in FIG. 4, in particular, generation of splits values for the various nodes of the base classification/regression tree.
Figure 15B:
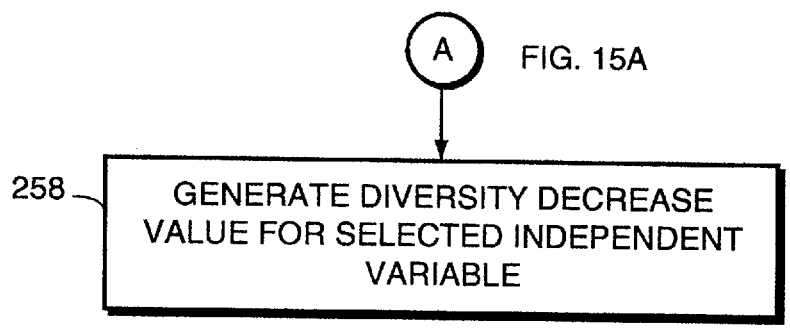
Figure 16A:
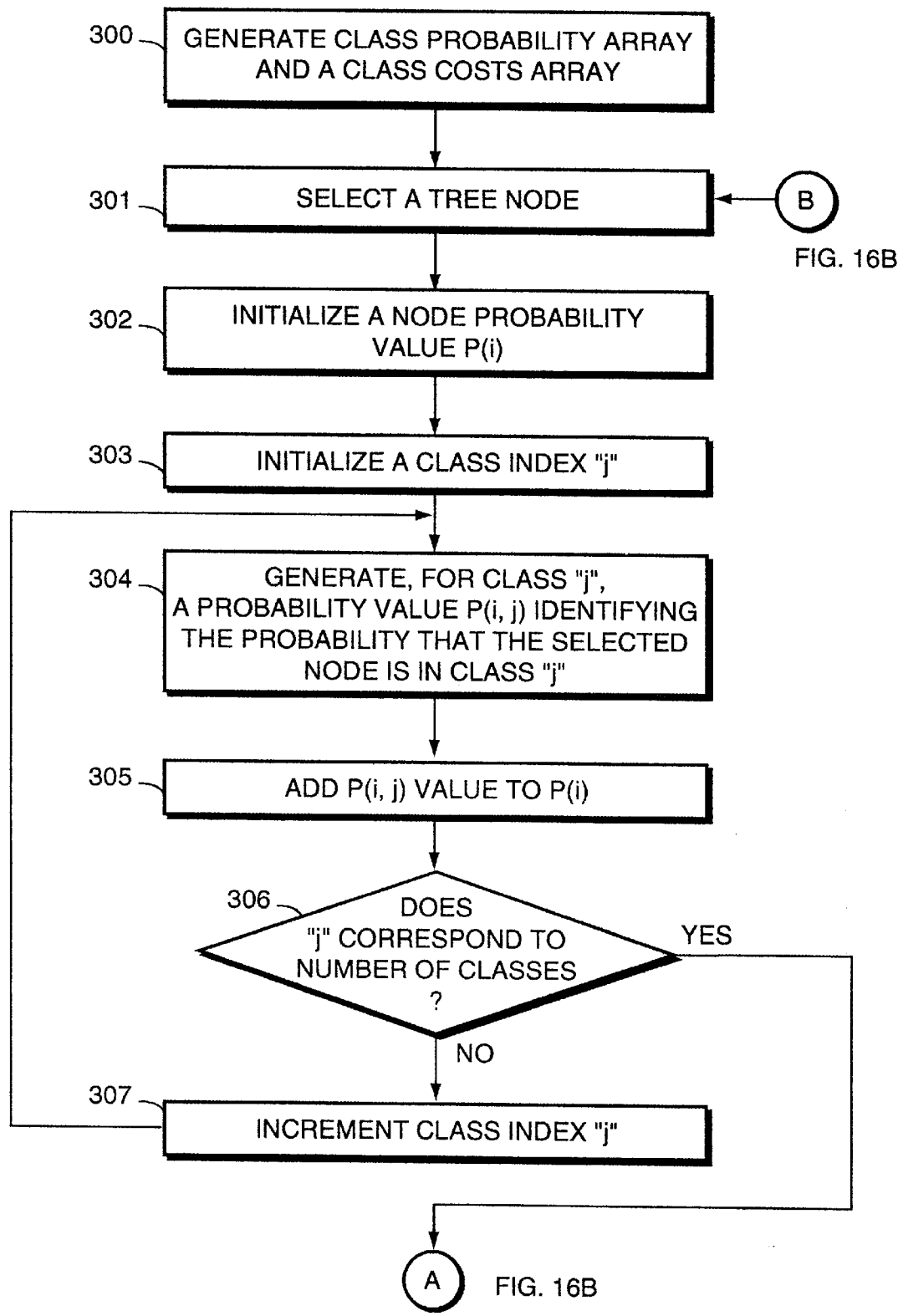
FIGS. 16 through 18 are detailed flow diagrams depicting operations performed in connection with further aspects of the operations depicted in FIG. 3, in particular, labeling the nodes, generating a set of pruned trees and evaluating each of the pruned trees.
Figure 16B:
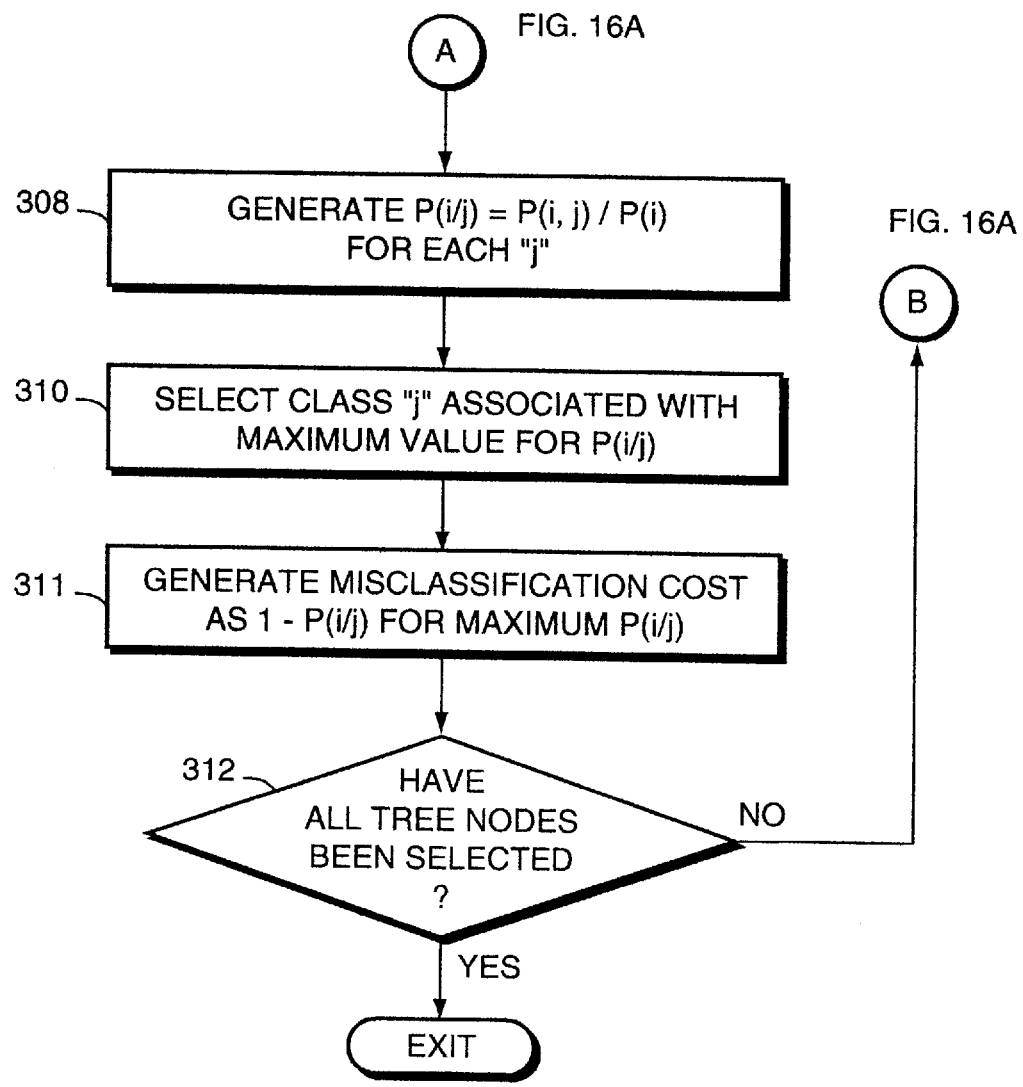
Figure 17A:
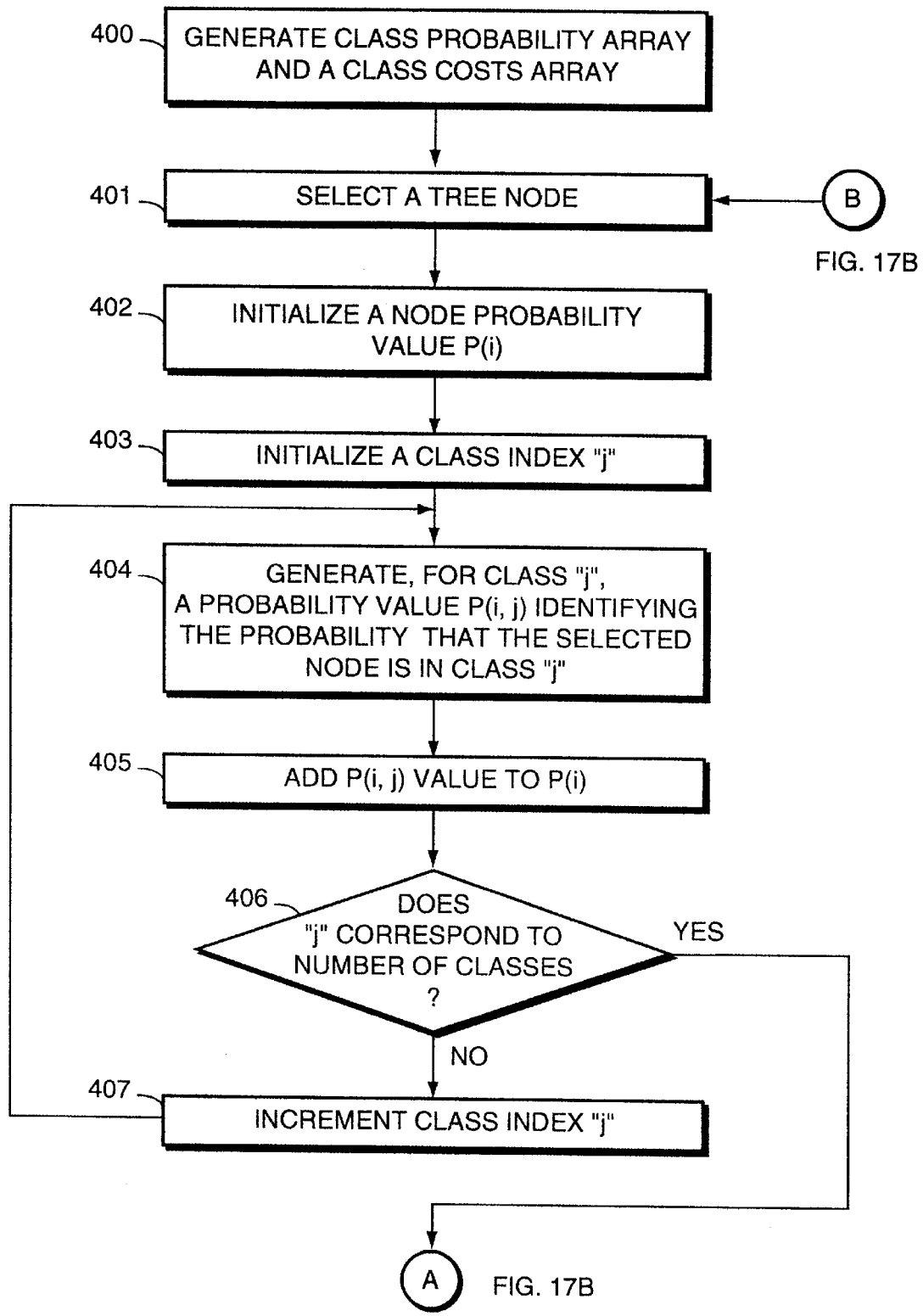
Figure 17B:
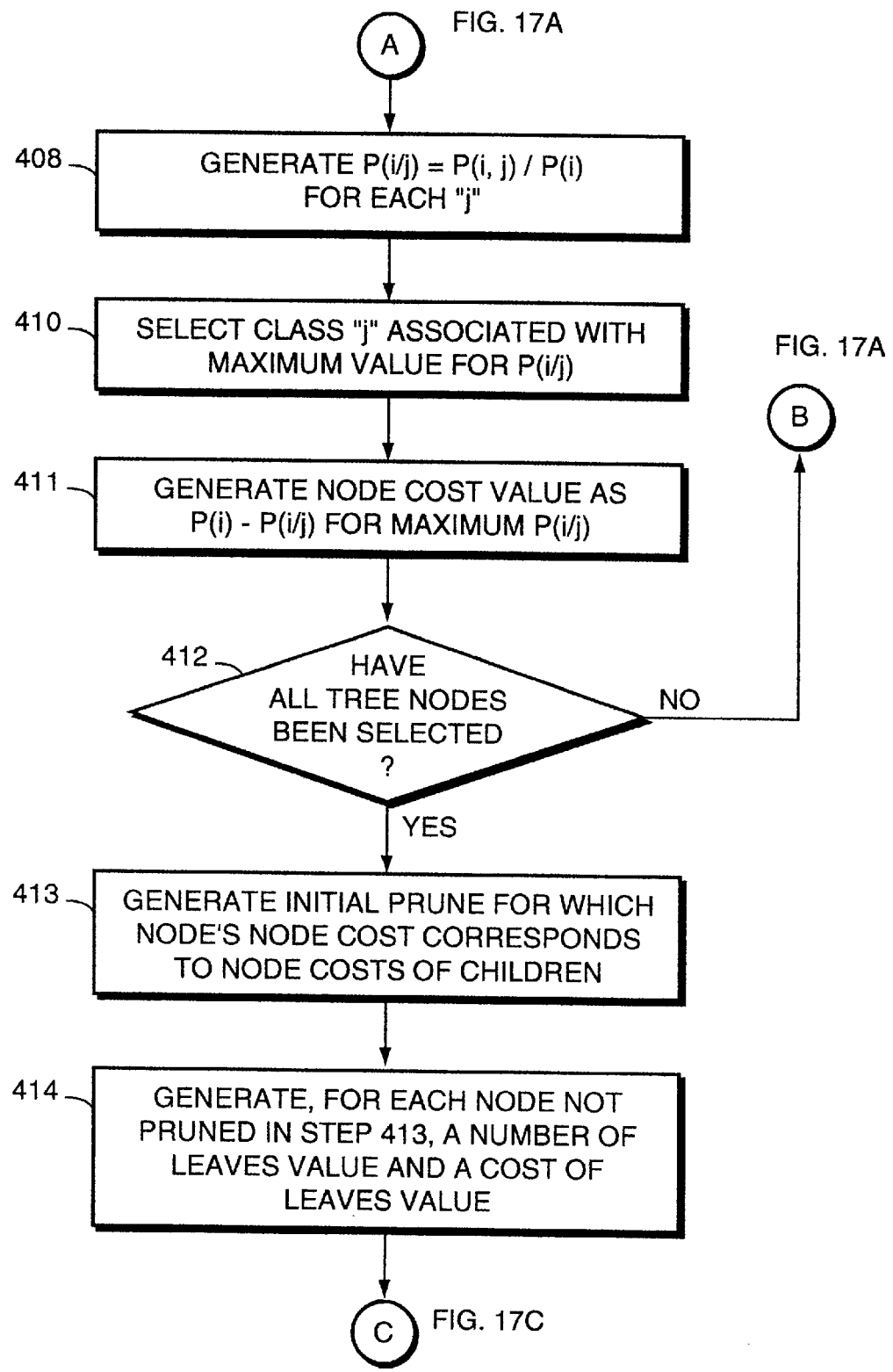
Figure 17C:
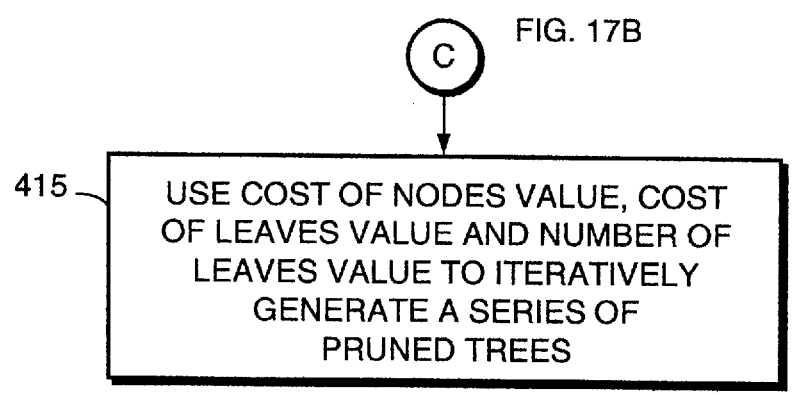

As described above, after generating the base tree, the classification/regression tree generating system will use the training database to label each node of the base tree with its likely class, a confidence factor identifying the likelihood that the base tree node is properly associated with that class and a misclassification cost value indicating the cost associated with the misclassification of a record in the node (step 101, FIG. 3). The detailed operations performed in connection with step 101 will be described in connection with FIG. 16. With reference to FIG. 16, the system initially establishes several temporary arrays, including a class probability array and a class costs array, each having a number of slots corresponding to the number of classes (step 300). Thereafter, the system steps through the successive nodes in the tree parallel variable 31 (FIG. 6) to identify a main class for the node and a misclassification cost value for the node. After selecting a tree node (step 301), the system establishes and initializes a node probability variable P(i) (step 302) and a class index "j" (step 303). The system then generates a probability value P(i,j) indicating the probability that the records in the selected node are properly classified in the selected class and stores it in the class probabilities slot identified by the value of the class index "j" (step 304). The system generates the probability value as the quotient which is multiplied by the selected class's prior probability value. It will be appreciated that the value generated as the number of records in the training database for the selected class "j" which have been allocated to the selected tree node during generation of the base tree divided by the total number of records which were allocated to the selected tree node, corresponds to the proportion of training database records allocated to the node during the tree construction step (FIGS. 4 and 15). After generating the probability value P(i,j) (step 304), the system adds it to the contents of the probability value P(i) established in step 302 (step 305). The system then determines whether the value of the class index "j" corresponds to the number of classes (step 306) and, if it does not, it increments the value of the class index "j" and returns to step 304 to repeat the operations in connection with the next class.

The system performs steps 304 through 306 in connection with each of the classes, identified by class index "j." When it determines in step 306 that the value of the class index "j" corresponds to the number of classes, it has generated probability values P(i,j) for each of the classes "j" and loaded them into successive slots of the class probabilities array established in step 300, and a probability value P(i) which corresponds to the sum of the probability values generated for the successive classes. At that point, the system normalizes the probability values P(i,j) by the value of the probability value P(i) (step 308) to generate conditional probability values P(i|j). The system thereafter identifies the slot of the class probability array having the largest conditional probability value P(i|j) and assigns the node to the class associated with the slot (step 310). The system loads the class identification, the conditional probability value P(i|j) and a misclassification cost value generated as the "1-P(i|j)" in the tree node of the tree parallel variable 31 (step 311), and sequences to step 312 to determine whether all of the tree nodes have been processed. If not, the system returns to step 301 to select the next tree node. The system will repeat the operations described above in connection with steps 301 through 311 until it determines in step 312 that all of the tree nodes have been processed, at which point it will exit and sequence to step 102 (FIG. 3) to generate a set of pruned trees.

Following labeling (step 101) as described above, the system will generate a series of pruned trees (step 102) using a pruning metric which relates the cost of nodes having additional nodes and leaves to the decrease in classification error for the tree with the additional nodes and leaves. The operations performed by the system in connection with step 103 will be describe in connection with FIG. 17. With reference to FIG. 17, the system will initially perform a series of steps 400–412 which are similar to steps performed in connection with labeling (FIG. 17) to generate a node cost value for each node; in particular, the system generates the conditional probability values P(i|j) and the probability value P(i) as described above in connection with FIG. 17, but generates the node cost value as the difference between the probability value P(i) and the largest of the conditional probability values P(i|j).

After generating the node cost value for all of the tree nodes (steps 400–412), the system will use the node cost values to prune the tree. In an initial prune (step 413), the system sequences through the tree nodes in the tree node parallel variable 31, from the leaf end toward the root end, to iteratively prune the interior nodes of the tree for which the node cost value equals the node cost value of its children. If the node cost value of a node corresponds to the node cost value of its children, the children represent no additional classification information, and so they can be discarded. After this initial prune, the system, again sequencing through the tree nodes in the tree node parallel variable 31 from the leaf end toward the root end, generates for each tree node that was not pruned during step 413, a number of leaves value and a cost of leaves value (step 414). In that operation, for each node which is a leaf after the initial pruning, the system generates a value of "one" for the number of leaves, and a value corresponding to the node's cost of node value as the node's cost of leaves value. On the other hand, for each node which is an interior node after the initial pruning (that is, for each node below the root level which is not a leaf), the system determines the number of leaves value as the sum of the number of leaves value that is associated with each of the node's children, and the cost of leaves value as the sum of the cost of leaves value associated with each of the node's children. Accordingly, for each interior node in the tree after the initial pruning, the node has a number-of-leaves value corresponding to the number of leaves in the sub-tree of which the node is a relative root, as well as a cost-of-leaves value corresponding to the sum of the costs of the leaves in that sub-tree.

Following step 414, the system sequences to step 415 to generate the series of pruned trees, using the number of leaves and cost of leaves values that were generated for each of the nodes as well as the cost of node value that was generated for each of the nodes in the previous steps. The system generates the pruned trees in a series of iterations, in each iteration generating a pruned tree. To generate a pruned tree in an iteration, the system, for each interior node in the tree, generates a metric value, identified herein as "alpha," corresponding to the difference between the node's cost-of-nodes value and the cost-of-leaves value, divided by the node's number-of-leaves value minus one. The alpha value so generated is a metric reflecting the relative improvement, per leaf, that the sub-tree under the node would provide by including the sub-tree in the tree when the tree is processing the training database. Accordingly, the system generates a pruned tree in an iteration by identifying the node for which the alpha metric is a minimum (or nodes, if plural nodes have the same minimum value); for the identified node(s), the sub-tree(s) would clearly provide the least improvement if included in the pruned tree. The identification(s) of the node(s) for which the alpha metric is a minimum, along with the value(s) of its (their) alpha metric(s) is (are) saved thereby to identify the leaf (leaves) of the first pruned tree. The node(s) so identified are then indicated as being leaves, and the process is repeated in connection with the first pruned tree. The system repeats these operations through a plurality of iterations, generating a pruned tree in each iteration, until the pruned tree corresponds to the root node of the tree parallel variable 31.

Figure 18A:
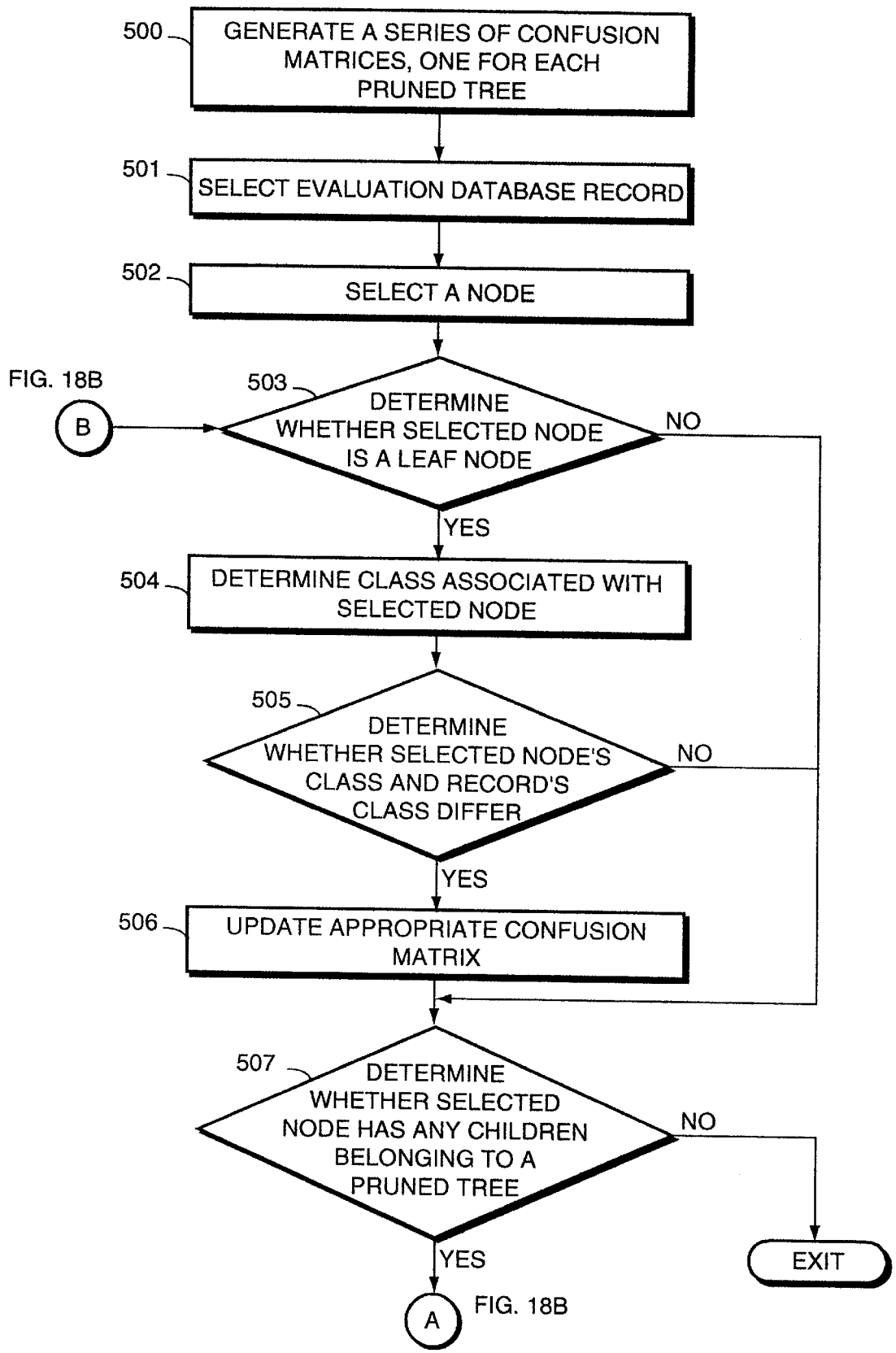
Figure 18B:
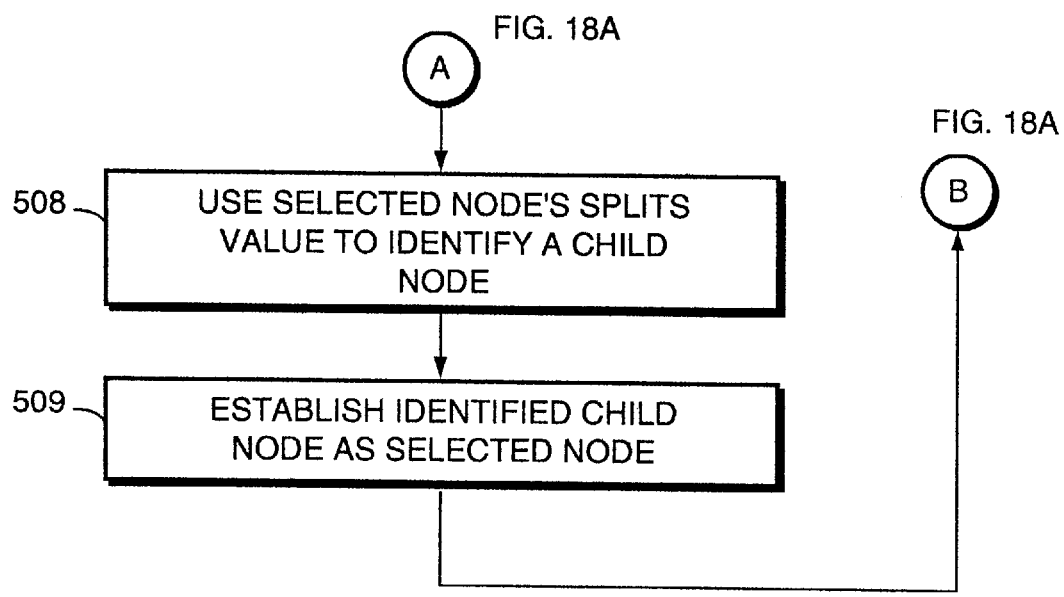

After generating the set of pruned trees, the system uses properly classified records of an evaluation database to generate evaluation values for each of the pruned trees (step 103, described in more detail below in connection with FIG. 18). The evaluation values generally reflect, for each of the pruned trees, the number of records which were properly classified and the cost of the misclassification of the improperly classified records. Based on the evaluations, an operator (or an applications program, if the classification/regression tree generation system was called or controlled by an applications program) may select a pruned tree to be used in classifying a database whose records have not previously been classified.

In evaluating the series of pruned trees, the system initially establishes a series of matrices, which will be called herein "confusion" matrices, each of which is associated with one of the pruned trees generated in step 102 (FIG. 1) (step 500). Each confusion matrix includes a number of rows and a number of columns each corresponding to the number of classes in which the database records can be classified. The system will use each matrix to store indications of misclassification of the records of the evaluation database by the associated pruned tree, and so the columns of each matrix correspond to the proper classifications for the records and the rows of each matrix correspond to the classification as determined by the pruned tree which corresponds to the matrices.

After establishing the confusion matrices, the system selects a record of the evaluation database (step 501) and begins walking down the tree from the first, root node to identify the classifications for the records as identified by each of the pruned trees. In that operation, the system selects a node (step 502) and determines whether the selected node is a leaf node (step 503). If the system determines in step 503 that the node is a leaf node, it identifies the class associated with the leaf node (step 504), as determined during labeling and pruning (steps 101 and 102, FIG. 3), and determines whether the class associated with the leaf node corresponds to the class associated with the record (step 505). If the system determines in step 505 that the leaf node's class and the record's class differ, it identifies the matrix element of the confusion matrix associated with the column identified by the record's class and the row identified by the node's class and increments the value of that matrix element by one (step 506).

Following step 506, if the system determines in that step that the leaf node's class and the record's class are the same, or following step 503 if the system determines that the selected node is not a leaf node, the system sequences to step 507 to determine whether the selected node has any children which belong to one of the pruned trees, and if so it uses the splits value associated with the selected node to identify one of the selected node's child nodes in step 500. The system then selects the identified child node as the selected node (step 509), and returns to step 503 to repeat the operations described above in connection with that node.

The system repeats the operations described above in connection with steps 503 through 508 through a plurality of iterations stepping down the tree from node to node, in each iteration determining whether the node selected for the iteration is a leaf node, if so identifying the class and updating the confusion matrix for the appropriate pruned tree, until it determines in step 507 that the selected node does not have any child nodes which form part of a pruned tree. At that point, it has finished processing the first record of the evaluation database, and so it will sequence to step 509 to determine whether there are any additional records in the evaluation database. If so, it returns to step 501 to select the next record in the evaluation database. The system performs the above-described operations in connection with each of the records in the evaluation database to generate matrix elements in the confusion matrix which identify, for each of the pruned trees, the number of records for which the pruned tree produced a misclassification.

After generating the confusion matrices, the system may generate a unitary misclassification number (step 510) for each pruned tree, corresponding to the total number of misclassifications identified by the matrix elements of the confusion matrix associated with the pruned tree. Alternatively or in addition, the system may update the misclassification indications provided by the confusion matrices in connection with the misclassification cost values described above, and may generate a unitary corresponding to the sum of the total number of misclassifications as updated by the misclassification cost values. The system may provide the unitary misclassification number of unitary misclassification cost value to the operator to facilitate selection of a pruned tree for, for example, use on unclassified records.

The above description has assumed that the values of the fields or variables of the database are essentially numeric or otherwise can be assigned an order. If a field does not have such an inherent ordering, the values that are present in the field are "categorical." In that case, the classification/regression tree generating system can establish an ordering for the values that are present in the field based on the probability of the occurrence of each value.

In addition, the above description has assumed that the tree 10 being generated is a classification tree. In generating a regression tree, in identifying the splits values (FIG. 15), the system, instead of a diversity decrease metric in identifying splits values for the independent variables, uses a least-squares-error metric. Similarly, in performing tree evaluation (FIG. 18), instead of using the number or cost of misclassifications, the system generates and uses a least-squares-error metric for the records of the evaluation database.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A classification tree generating system for generating a classification tree, in response to a training database including a plurality of properly-classified records, the tree having a plurality of nodes each disposed in a layer relative to a root node, the tree generating system comprising:

A. parallel base tree generating means including a plurality of processing nodes for generating a base classification tree having a plurality of base tree nodes each disposed in a layer relative to a base tree root node, the nodes of each layer of the base classification tree being generated in parallel based on the properly-classified records of the training database; and B. serial tree processing means including a single processor for generating a plurality of pruned classification trees in response to the base classification tree by discarding one or more nodes of the base classification tree and generating at least one selected evaluation metric for each pruned classification tree in response to an evaluation training data-base including a second plurality of properly-classified records, each evaluation metric corresponding to a number of misclassified evaluation records by the respective pruned classification tree, wherein one of the pruned trees may be selected, in response to the evaluation metrics, as the classification tree for use in classifying a plurality of as yet unclassified records of a database.

2. The classification tree generating system of claim 1 further comprising:

at least one control processor; and an interconnection network coupled to each of the processing nodes and the control processor, wherein the control processor is configured and arranged to control the operation of the plurality of processing nodes.

3. The classification tree generating system of claim 2 wherein the plurality of processing nodes are configured and arranged to identify a corresponding split value for each node of the base classification tree.

4. A method for generating a classification tree for use in classifying a plurality of records of a given database, the classification tree having a plurality of nodes, each disposed in a layer relative to a root node, the method comprising the steps of:

A. generating a base classification tree defined by a plurality of base tree nodes, each disposed in a layer relative to a base tree root node, the base tree nodes being defined in parallel for each layer in response to a training database including a plurality of properly-classified records;

B. labeling each base tree node, in series, with (i) a corresponding class identifier, (ii) a confidence factor that identifies the likelihood that the respective base tree node is properly associated with its corresponding class identifier, and (iii) a miscalculation cost value that corresponds to a cost associated with misclassifying records of the given data-base;

C. generating a series of pruned trees from the base classification tree, each pruned tree being generated by discarding one or more base tree nodes from the base classification tree;

D. calculating an evaluation value for each pruned tree in response to an evaluation database including a plurality of properly-classified evaluation records, such that one or more of the evaluation records are improperly classified by the respective pruned tree, the respective evaluation value corresponding to the number of evaluation records improperly classified by the corresponding pruned tree;

E. selecting, based upon the evaluation values, one of the pruned trees as the classification tree for use in classifying the records of the given database.

5. The method of claim 4 wherein the step of generating the base classification tree further comprises the step establishing a plurality of data variables, including a training data-base parallel variable and a diversity decrease parallel variable, each having a slot corresponding to one of the records of the training database, the slots capable of storing a value.

6. The method of claim 5 wherein the step of generating the base classification tree further comprises the step of transferring each record of the training database to a preselected slot of the training database variable.

7. The method of claim 6 wherein each record of the training database includes one or more independent variables and the step of generating the base classification tree further comprises the step of determining a corresponding splits value and diversity decrease value for each independent variable of the training database records.

8. The method of claim 7 wherein the values stored in the slots of the diversity decrease parallel variable are initially zeroed and the step of generating the base classification tree further comprises the step of comparing the diversity decrease value generated for a given independent variable to the value stored in the respective one of the slots of the diversity decrease parallel variable associated with the corresponding independent variable and, if the generated diversity decrease value is greater than the stored value, loading the generated diversity decrease value into the corresponding slot.

9. The method of claim 8 wherein the step of generating a plurality of pruned trees further comprises the steps of:

determining whether one or more base tree nodes provides additional classification information; and discarding one or more base tree nodes that have been determined to provide no additional classification information to the base classification tree so as to generate a pruned classification tree.

* * * * *